United States Patent
Rigali et al.

(10) Patent No.: US 6,709,737 B2
(45) Date of Patent: Mar. 23, 2004

(54) ALIGNED COMPOSITE STRUCTURES FOR MITIGATION OF IMPACT DAMAGE AND RESISTANCE TO WEAR IN DYNAMIC ENVIRONMENTS

(75) Inventors: Mark J. Rigali, Tucson, AZ (US); Manish P. Sutaria, Philadelphia, PA (US); Anthony C. Mulligan, Tucson, AZ (US); Dragan Popovich, Phoenix, AZ (US)

(73) Assignee: Advanced Ceramics Research, Inc., Tucson, AZ (US)

( * ) Notice: Subject to any disclaimer, the term of this patent is extended or adjusted under 35 U.S.C. 154(b) by 183 days.

(21) Appl. No.: 10/005,084

(22) Filed: Dec. 4, 2001

(65) Prior Publication Data

US 2003/0104238 A1 Jun. 5, 2003

Related U.S. Application Data

(60) Provisional application No. 60/251,172, filed on Dec. 4, 2000.

(51) Int. Cl.$^7$ .................. D21H 11/00; D21H 13/00; B32B 3/00; B32B 17/00; B32B 18/00
(52) U.S. Cl. ................ 428/304.4; 428/315.9; 428/311.51; 428/311.71; 428/210; 428/411.1
(58) Field of Search ............. 428/411.1, 315.9, 428/311.51, 311.71, 210, 304.4; 264/639, 250

(56) References Cited

U.S. PATENT DOCUMENTS

| 4,772,524 A | 9/1988 | Coblenz |
| 5,053,092 A | 10/1991 | Lachman |
| 5,398,193 A | 3/1995 | Deangelis |
| 5,588,997 A | 12/1996 | Lysson et al. |
| 5,645,781 A | 7/1997 | Popovic et al. |
| 5,679,157 A | 10/1997 | Milliman |
| 6,063,502 A | 5/2000 | Sue et al. |
| 6,193,001 B1 | 2/2001 | Eyre et al. |
| 6,315,065 B1 | 11/2001 | Yong et al. |
| 6,325,165 B1 | 12/2001 | Eyre |
| 6,361,873 B1 | 3/2002 | Yong et al. |
| 6,451,442 B1 | 9/2002 | Sue et al. |
| 2002/0237384 | 9/2002 | Mulligan et al. |
| 2002/0154741 A1 | 10/2002 | Rigali et al. |

FOREIGN PATENT DOCUMENTS

| WO | WO 01/53059 A1 | 7/2001 |

OTHER PUBLICATIONS

PCT International Search Report mailed Feb. 25, 2003, (PCT/US02/38804).

PCT International Search Report mailed Feb. 28, 2003, (PCT/US02/38654).

PCT International Search Report mailed Mar. 6, 2003, (PCT/US02/38680).

J. J. Brennan and K. M. Prewo, "High–Strength Silicon Carbide Fibre Reinforced Glass–Matrix Composites," *J. Mater. Sci.*, 15 463–68 (1980).

J.J. Brennan and K. M. Prewo, "Silicon Carbide Fibre Reinforced Glass–Ceramic Matrix Composites Exhibiting High Strength and Toughness," *J. Mater. Sci.*, 17 2371–83 (1982).

(List continued on next page.)

*Primary Examiner*—Terrel Morris
*Assistant Examiner*—Lynda M Salvatore
(74) *Attorney, Agent, or Firm*—Banner & Witcoff, Ltd.

(57) ABSTRACT

Fibrous monolith composites having architectures that provide increased flaw insensitivity, improved hardness, wear resistance and damage tolerance and methods of manufacture thereof are provided for use in dynamic environments to mitigate impact damage and increase wear resistance.

16 Claims, 4 Drawing Sheets

OTHER PUBLICATIONS

G. Hilmas, et al., "Fibrous Monoliths: Non–Brittle Fracture from Powder–Processed Ceramics," *Mat. Sci. & Eng. A.*, 195, 263–268 (1995).

G.E. Hilmas, et al., "SiC and $Si_3N_4$ Fibrous Monoliths: Non–Brittle Fracture From Powder Processed Ceramics Produced by Coextrusion," vol. 51 *Ceramic Processing Science and Technology*, pp. 609–614 (1993).

H. Kodama, et al., "Silicon Carbide Monofilament–Reinforced Silicon Nitride or Silicon Carbide Matrix Composites," *J. Am. Ceram. Soc.*, 72 [4] 551–58 (1989).

D. Kovar, et al., "Fibrous Monolithic Ceramics" *J. Am. Ceram. Soc.*, 80, [10] 2471–2487 (1997).

P.J. Lamicq, et al., "SiC/SiC Composite Ceramics," *Am. Ceram. Soc. Bull.*, 65 [2] 336–38 (1986).

T.I. Mah, et al., "Recent Developments in Fiber–Reinforced High Temperature Ceramic Composites," *Am. Ceram. Soc. Bull.*, 66 [2] 304–08 (1987).

K.M. Prewo, "Fiber–Reinforced Ceramics: New Opportunities for Composite Materials," *Am. Ceram. Soc. Bull.*, 68 [2] 395–400 (1989).

J.R. Strife, et al., "Status of Continuous Fiber–Reinforced Ceramic Matrix Composite Processing Technology," *Ceram. Eng. Sci. Proc.*, 11 [7–8] 871–919 (1990).

ALIGNED COMPOSITE STRUCTURES FOR MITIGATION OF IMPACT DAMAGE AND RESISTANCE TO WEAR IN DYNAMIC ENVIRONMENTS

CROSS-REFERENCE TO RELATED APPLICATIONS

This application is based on, and claims the benefit of, co-pending U.S. Provisional Application Ser. No. 60/251, 172, filed on Dec. 4, 2000, and entitled "Aligned Fibrous Monolith Constructs for Mitigation of Foreign Object Damage in Dynamic Environments."

This invention was made with U.S. Government support under grants DE-FC02-96CH10861 and DE-FC26-01NT41051 awarded by the Department of Energy. Accordingly, the Government may have certain rights in the invention described herein.

FIELD OF THE INVENTION

The present invention relates to fibrous monolith composites that provide increased flaw insensitivity, improved hardness, wear resistance, and damage tolerance for use in dynamic environments to mitigate impact damage to, and/or increase the wear resistance of, structures comprising such materials.

BACKGROUND OF THE INVENTION

Certain carbides, nitrides, borides, oxides, and suicides exhibit enhanced mechanical properties, including damage tolerance and wear resistance. As a result, these materials have found use in dynamic environments where the materials are subject to harsh conditions, such as increased wear, thermal shock, elevated temperatures and the like. For example, many of the carbides, nitrides, borides, oxides, and silicides of the elements from Groups IVb, Vb, and VIb of the periodic table, as well as carbides, nitrides, borides, oxides, and silicides of boron, aluminum, and silicon have been used in industrial and other applications where such conditions are likely to be encountered. Generally, structures formed of these materials exhibit improved strength and hardness at ambient and elevated temperatures, improved toughness and wear resistance, high melting points, thermal shock resistance, and oxidation resistance.

These materials have found use in the fabrication of structures that may be subject to impact damage by foreign objects, which is commonly referred to as foreign object damage (FOD), such as in turbomachinery and turbine engine applications. These materials also may be used for the fabrication of tools, inserts and other implements that may be subject to wear impact damage, such as in mining, construction, machining and similar industrial applications. For example, because of their abrasive and impact wear resistance properties, materials formed of carbides, nitrides, borides, oxides, and silicides have been used in mining applications where, for example, extremely severe wear conditions and impact loadings may be encountered by the drill bits during rock crushing and removal. Additionally, because of their ability to withstand high temperatures, these materials also have been used in machining applications where very high localized temperatures may be encountered adjacent the cutting edge of the tool.

The usefulness of such materials, however, has been limited by a lack of wear resistance, damage tolerance and fracture toughness exhibited by the materials. As a result, structures fabricated from these materials tend to wear and/or fracture more quickly than is desired. The need for frequent replacement of parts is costly and results in down time that is both time consuming and costly.

There remains a need for materials exhibiting improved hardness, strength, wear resistance and fracture toughness, as compared to presently known materials, for use in dynamic environments to mitigate impact damage to, and/or increase the wear resistance of, structures comprising such materials.

SUMMARY OF THE INVENTION

The present invention relates to structures that include unique architectural arrangements of fibrous monolith ("FM") composites to provide the structures with increased flaw insensitivity, increased wear resistance, and damage tolerance. The present invention also relates to methods of fabricating such composites and structures.

The composites of the present invention may be used as coatings for existing structures to mitigate impact damage in dynamic environments and to reduce wear on the structures, as the composites demonstrate very high fracture energies, increased flaw insensitivity, increased wear resistance, and increased damage tolerance. Additionally, a more substantial portion of, or even a complete, structure may be formed from the FM composites, thereby extending the benefits obtained with use of the FM composites.

DETAILED DESCRIPTION OF THE INVENTION

In accordance with the present invention, there is provided structures including composite materials exhibiting mechanical properties including high hardness, excellent fracture toughness, damage tolerance and/or wear and abrasion resistance and methods of preparation thereof. More particularly, the structures of the present invention include fibrous monolithic ceramic and/or metallic composites that include a plurality of filaments having a core surrounded by a shell. The composites may be formed into structures and/or provided as a coating for or layered onto the outer surface of structures to impart the desired characteristics to the structure.

As used herein, "fibrous monolithic composite" and "fibrous monolith" are intended to mean a ceramic and/or metallic composite material that includes a plurality of monolithic fibers, or filaments, each having at least a cell phase surrounded by a boundary phase but may include more than one core and/or shell phase. Fibrous monoliths exhibit the characteristic of non-brittle fracture, such that they provide for non-catastrophic failure.

As used herein, "cell phase" is intended to mean a centrally located primary material of the monolithic fiber, that dense, relatively hard and/or strong. The cell phase extends axially through the length of the fiber, and, when the fiber is viewed in transverse cross-section, the cell phase forms the core of the fiber. The "cell phase" also may be referred to as a "cell" or "core".

As used herein, "boundary phase" is intended to mean a more ductile and/or weaker material that surrounds the cell phase of a monolithic fiber in a relatively thin layer and that is disposed between the various individual cell phases, forming a separating layer between the cell phase and surrounding cell phases when a plurality of fibers are formed in a fibrous monolithic composite. The "boundary phase" also may be referred to as a "shell," "cell boundary" or "boundary".

Fibrous monoliths ("FMs") are a unique class of structural ceramics that have mechanical properties similar to continuous fiber reinforced ceramic composites (CFCCs). Such properties include relatively high fracture energies, damage tolerance, and graceful failures. In contrast to CFCCs, FMs can be produced at a significantly lower cost. FMs, which are monolithic ceramics, generally are manufactured by powder processing techniques using inexpensive raw materials. As a result of the high performance characteristics of FMs and the low costs associated with manufacture of FMs, FMs are used in a wider range of applications than heretofore typical for ceramic composites.

Figure 1:
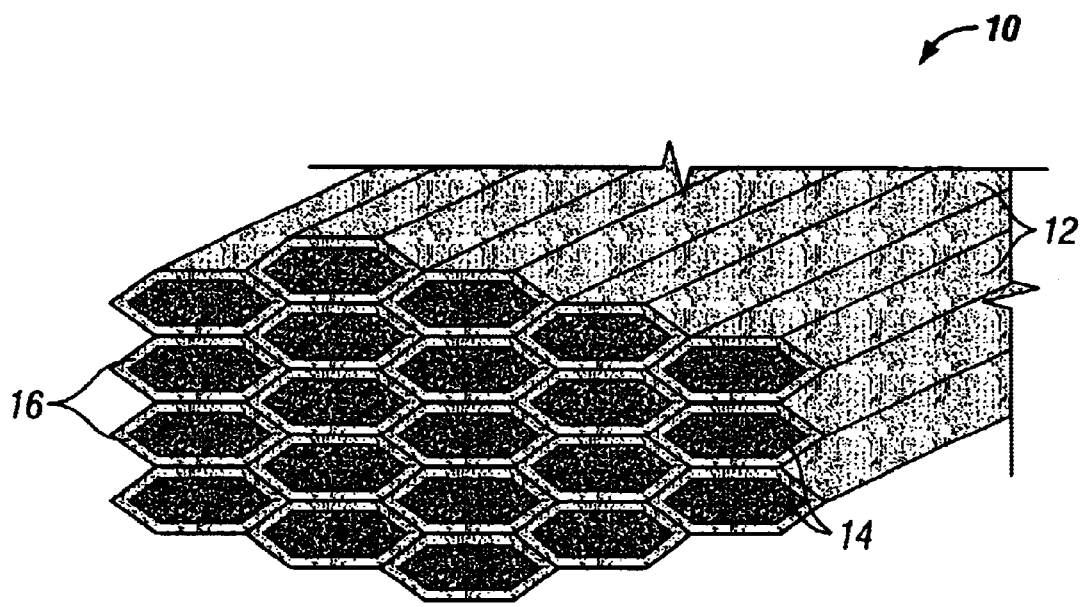
FIG. 1 is a perspective cross-sectional view of a uniaxial fibrous monolith composite in accordance with the present invention.

As shown in FIG. 1, the macroarchitecture of an FM composite 10 generally includes multiple filaments 12 each comprising at least two distinct materials—a primary phase in the form of elongated polycrystalline cells 14 separated by a thin secondary phase in the form of cell boundaries 16. Typical volume fractions of the two phases are between about 50 to about 99% of the fiber for the primary phase (polycrystalline cell) and between about 1 to about 50% of the fiber for the interpenetrating phase (cell boundary). Preferably, the volume fractions are between about 80 to about 95% for the primary phase (polycrystalline cell) and between about 5 to about 20% for the interpenetrating phase (cell boundary). The primary or cell phase typically consists of a structural material of a metal, metal alloy, carbide, nitride, boride, oxide, phosphate or silicide and combination thereof. The cells are individually surrounded and separated by cell boundaries of a tailored secondary phase. Powders that may be used in the secondary phase include compounds to create weak interfaces such as fluoromica, and lanthanum phosphate; compounds to create porosity in a layer which function to create a weak interface; graphite powders and graphite-containing powder mixtures; and hexagonal boron nitride powder and boron nitride-containing powder mixtures. If a metallic debond phase is desired, reducible oxides of metals may be used, e.g., nickel and iron oxides, or powders of metals, e.g., nickel, iron, cobalt, tungsten, aluminum, niobium, silver, rhenium, chromium, or their alloys.

Advantageously, powders which may be used in the cell and/or boundary phase composition to provide the green matrix filament include diamond, graphite, ceramic oxides, ceramic carbides, ceramic nitrides, ceramic borides, ceramic silicides, metals, and intermetallics. Preferred powders for use in that composition include aluminum oxides, barium oxides, beryllium oxides, calcium oxides, cobalt oxides, chromium oxides, dysprosium oxides and other rare earth oxides, hafnium oxides, lanthanum oxides, magnesium oxides, manganese oxides, niobium oxides, nickel oxides, tin oxides, aluminum phosphate, yttrium phosphate, lead oxides, lead titanate, lead zirconate, silicon oxides and silicates, thorium oxides, titanium oxides and titanates, uranium oxides, yttrium oxides, yttrium aluminate, zirconium oxides and their alloys; boron carbides, iron carbides, hafnium carbides, molybdenum carbides, silicon carbides, tantalum carbides, titanium carbides, uranium carbides, tungsten carbides, zirconium carbides; aluminum nitrides, cubic boron nitrides, hexagonal boron nitrides, hafnium nitride, silicon nitrides, titanium nitrides, uranium nitrides, yttrium nitrides, zirconium nitrides; aluminum boride, hafnium boride, molybdenum boride, titanium boride, zirconium boride; molybdenum disilicide; lithium and other alkali metals and their alloys; magnesium and other alkali earth metals and their alloys; titanium, iron, nickel, chromium, cobalt, molybdenum, tungsten, hafnium, rhenium, rhodium, niobium, tantalum, iridium, platinum, zirconium, palladium and other transition metals and their alloys; cerium, ytterbium and other rare earth metals and their alloys; aluminum; carbon; lead; tin; and silicon.

Compositions comprising the cell phase differ from those comprising the boundary phase in order to provide the benefits generally associated with FMs. For example, the compositions may include formulations of different compounds (e.g., HfC for the cell phase and WRe for the boundary phase or WC—Co and W—Ni—Fe) or formulations of the same compounds but in different amounts (e.g., WC-3% Co for the cell phase and WC-6% Co for the boundary phase) as long as the overall properties of the compositions are not the same. For example, the compositions can be selected so that no excessively strong bonding occurs between the two phases.

Figure 2:
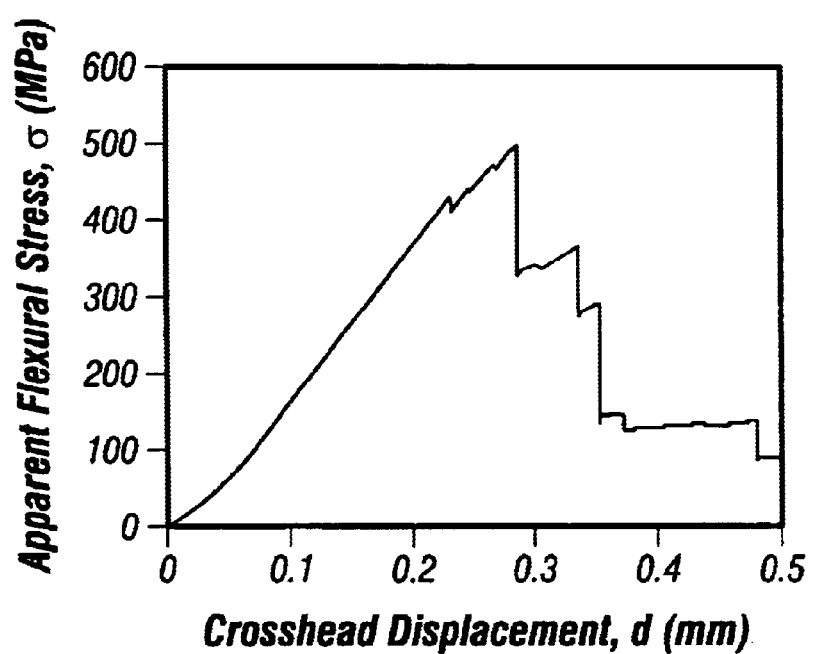
FIG. 2 is a graphical illustration of flexural stress as a function of displacement for a fibrous monolith composite in accordance with the present invention.

The cell boundary phase may be selected to create pressure zones, microcrack zones, ductile-phase zones, or weak debond-type interfaces in order to increase the toughness of the composite. For example, low-shear-strength materials such as graphite and hexagonal boron nitride make excellent weak debond-type cell boundaries and are present in $Si_3N_4$/BN and SiC/Graphite FM composites. The weak BN and graphite interfaces deflect cracks and delaminate thereby preventing brittle failure of these composites and increasing their fracture toughness. As a result, FM structures exhibit fracture behavior similar to CFCCs, such as C/C and SiC/SiC composites, including the ability to fail in a non-catastrophic manner. By way of example, typical flexural stress as a function of displacement for a $Si_3Ni_4$/BN FM material is shown in FIG. 2, which illustrates that fibrous monolith composites are non-brittle and retain significant load bearing capability after fracturing is initiated.

Composites of the present invention include multifilament FM layers and FM substrates with unique fiber orientations. These composites may be used to fabricate various structures, or may be applied as coatings on the desired structures, to mitigate impact damage to the structures. Use of the composites also may increase the wear resistance lifetime of structures used in dynamic environments, such as the environments encountered in the mining and metal cutting tool industries.

The FM composites of the present invention demonstrate very high fracture energies, increased flaw insensitivity, increased wear resistance, and increased damage tolerance. Such properties are critical in applications where impact damage from foreign objects is a concern, for example, in turbomachinery and turbine engine applications.

The FM composites of the present invention exhibit excellent thermal shock resistance, excellent wear resistance, excellent erosion and oxidation/corrosion resistance, very high hardness, high elastic modulus, good strength at ambient and elevated temperatures, and high toughness at room and elevated temperatures. These properties make these materials very good candidates for wear applications in mining. Their high hardness allows the wear component to maintain its geometry for longer time periods during operation. Excellent wear resistance makes the wear component more resistant to extremely abrasive environments occurring in contact with crushed rock. Good flexural and tensile strength at ambient and elevated temperatures makes the wear component better able to withstand the loads experienced during operation. High fracture toughness makes the wear component less likely to fracture under dynamic loads and impacts experienced in contact with crushed rock during material removal. Resistance to corrosion makes the wear component last longer under extreme load and environmental conditions encountered during mining processes. These properties also make these materials very good candidates for cutting tool applications. Their high hardness allows the tool to maintain a sharp cutting edge for longer time periods during operation. Good flexural and tensile strength at room and elevated temperatures makes the tool better able to withstand the loads experienced during cutting. High fracture toughness makes the tool less likely to fracture under dynamic loads and impacts experienced during cutting. Good thermal shock resistance makes the tool less likely to shatter during thermal cycling that takes place during cutting. High elastic modulus makes the tool less susceptible to elastic deformation under cutting loads. Resistance to corrosion and oxidation allows the tool to better maintain a sharp edge under extreme load, temperature, and environmental conditions encountered during cutting.

Low shear strength cell boundaries, such as BN and graphite, accommodate the expansions and contractions that occur during thermal cycling of the FM composite components, thereby resulting in improved thermal shock resistance. From the mechanical behavior viewpoint, such cell boundaries enable non-catastrophic failure due to stress delocalization and crack deflection mechanisms at both room and elevated temperatures. In addition, the presence of a ductile or relatively ductile cell boundary phase increases the damage tolerance and wear resistance of the FM composite. Without intending to be limited by any theories, it is believed that the improvement in damage tolerance of the present composites is attributed to the FM architecture in which the cell boundary absorbs and deflects crack energy during impact so that damage, when it occurs, is isolated to the individual micron-sized cells.

Figure 3:
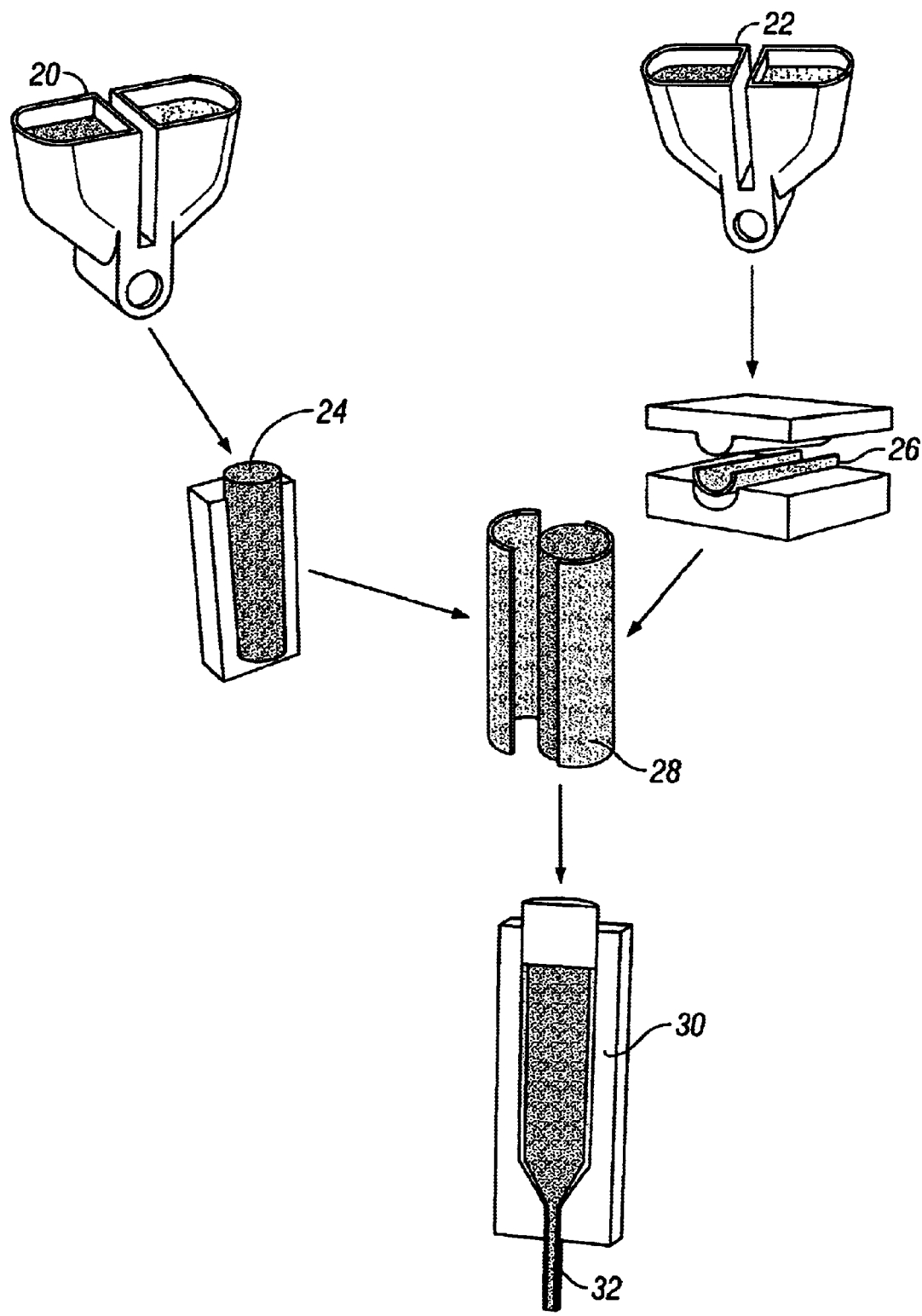
FIG. 3 is a schematic flow diagram showing a process of preparing filaments in accordance with the present invention.

Various methods of preparing fibrous monolithic filaments are known in the art, including the methods disclosed in U.S. Pat. No. 5,645,781, which is incorporated by reference herein in its entirety. Generally, as illustrated in FIG. 3, the process of preparing fibrous monolithic filaments in accordance with the present invention includes separately blending the starting materials for a core 20 and shell 22, forming the core 24 having a first composition and forming the shell 26 having a second composition, forming the feed rod 28 from the core and shell, and extruding the feed rod 30 one or more times to provide a ceramic filament 32. The filaments may then be formed and/or arranged to provide the desired structure in accordance with the present invention.

Fibrous monolith composites are fabricated using commercially available ceramic and metal powders using a process for converting ordinary ceramic powder into a "green" fiber that include the powder, a thermoplastic polymer binder and other processing aids. The fiber is compacted into the "green" state to create the fabric of elongated polycrystalline cells that resemble a fiber after sintering or hot pressing. The process is widely applicable, and allows a cell/cell boundary bi-component fiber to be made from a thermodynamically compatible set of materials available as sinterable powders. The scale of the microstructure is determined by the green fiber diameter (cell size) and coating thickness (cell boundary). Once the green composite fiber is fabricated it can be formed using any method known to those skilled in the art into the shape of the desired component having, for example, conventional composite architecture (e.g., uniaxial lay-up, biaxial lay-up, woven fabric, etc.). The thermoplastic binder is removed in a binder burnout step, and the component is hot pressed or sintered to obtain a fully consolidated and densified component.

The core and shell of the feed rod are formed of mechanically activated and agglomerate-free powders. The powders, such as the metals, alloys, carbides, nitrides, borides, oxides and silicides listed above, are selected to provide the desired mechanical properties in the final composite. A wide variety of combinations of powders may be used for the core and shell materials. Powders having particle size distributions in the range of about 0.01 to about 100 microns ($\mu$m) in size may be used. Preferably, the particle size of the powder is between about 1 to about 10 microns.

Milling stations such as commercially available from Boston Gear, Boston, Mass. may be used as needed to ball mill the ceramic powder to obtain the desired size distribution. The desired ceramic powder preferably is ball milled with ethanol. The ceramic/ethanol blend is ball milled with milling media such as silicon nitride ($Si_3N_4$) or zirconium oxide ($ZrO_2$) thus creating a ball-mill slurry. Sintering aids such as, for example, aluminum oxide ($Al_2O_3$) and yttrium oxide ($Y_2O_3$) additions to $Si_3N_4$, when necessary, are added and milled together with the ball mill slurry. The powders are milled for a time effective for providing desired particle sizes and distribution. Typical milling times are between about 24 to about 120 hours, depending on the starting ceramic material. For example, boron nitride (BN) powder is milled for about 12 to 24 hours, silicon nitride powder is milled for about 24 hours, and zirconium carbide (ZrC), purchased as a fairly coarse refractory ceramic, is typically milled for a longer period, about 72 to 120 hours.

Upon completion of the milling operation, the ball mill slurry is collected from the milling station and the ceramic/ ethanol mixture is separated from the milling media using a perforated mill jar lid as a "strainer". The ethanol is separated from the ceramic powder using a Buchi Rotavapor separator commercially available from Brinkman Instruments Inc. of Westbury, N.Y. Solvent is evaporated from the ball-milled slurry in the Buchi Rotavapor separator and the ceramic powder dried. Ethanol solvent may be reclaimed as desired for reuse or proper disposal according to local, state, and federal waste disposal requirements. The ceramic powders are removed from the separator jar and placed in labeled plastic jars.

The individual ceramic powders are blended with thermoplastic melt-spinnable polymer binders, as well as one or more processing aids such as plasticizers as necessary, using a high shear mixer commercially available from C. W. Brabender of South Hackensack, N.J. or from Thermo Haake of Paramus, N.J., to form a smooth, uniformly suspended composite blend also referred to as a "dope". Examples of thermoplastic binders include ethylene ethylacetate (EEA) commercially available as DPDA-618NT from Union Carbide, ethylene vinylacetate (EVA) commercially available as ELVAX 470 from E. I. DuPont Co., and Acryloid Copolymer Resin (B-67) commercially available from Rohm and Haas, Philadelphia, Pa. Examples of plasticizers include heavy mineral oil (HMO) commercially available as Mineral Oil White, Heavy, Labguard® and methoxy polyethyleneglycol having a molecular weight of about 550 (MPEG-550) commercially available from Union Carbide. The composite blend is compounded at about 150° C. while metering a viscosity-modifying additive until a viscosity is obtained that will ensure desired rheology for a molten fiber extrusion process.

Because the mixers have fixed volume reservoirs, the recipes for the thermoplastic/ceramic blends produced in batches are formulated on a volumetric, as opposed to a gravimetric basis. As an example, one blend consists of between about 50 to about 62 vol. % of the ceramic powder, between about 37 to about 50 vol. % of the thermoplastics, and between about 0 to about 12 vol. % of the plasticizers. Thus, the mass of a batch of ceramic/thermoplastic dope varies with the density of the ceramic powder. By way of example, a batch of $Si_3N_4$ with a density of 3.44 g/cc produces approximately 1 kg of "green" compound material.

After mixing, the composite blends are warm-pressed into a green composite feed rod. A composite feed rod consists of a "core" of a primary ceramic material enclosed by a cladding or "shell" of a second ceramic material. A preferred feed rod pressing station includes a hydraulic vertical press with one or more heated cylindrical dies, which allows the cores to be pressed. A heated uniaxial platen press, such as commercially available from Carver Inc., of Wabash, Ind., is used to press the shells for the composite feed rods. The volume ratio of the core and shell of a composite feed rod can be systematically varied to any desired ration by using different sets of machine tooled core and shell dies. By way of example, "green" composite feed rods (22 mm in diameter) with the following core/shell volume ratios are commonly produced: 90/10, 82.5/17.5, 69/31, and 50/50.

A pressed feed rod is extruded. One extrusion process includes a computer numerically controlled (CNC) ball-screw extruder, including a ball screw from Thomson Saginaw of Saginaw, Mich., connected to a CNC directed current (DC) servomotor from Compumotor, Rohnert Park, Calif. The ball screw is connected to a brass metal rod that is used to pressurize and extrude the contents of the heated cylindrical die. The entire assembly is mounted and held vertically in a metal framework. Composite feed rods are extruded through a spinneret to produce a green fiber filament or "spaghetti". This process also is referred to as "single filament co-extrusion"(SFCX).

Typical filament sizes are 100 $\mu$m, 250 $\mu$m, or 320 $\mu$m, 500 $\mu$m, 750 $\mu$m, 1 mm, 2 mm or 4 mm in diameter. Filaments having diameters between about 0.01 and about 10 mm may be extruded using a spinneret fabricated with the appropriate orifice diameter. The extruded filaments maintain the volume ratio of the original feed rod despite significant differences in diameters, such as a starting feed rod diameter of 22 mm and an extruded filament diameter of 250 $\mu$m (which is approximately 100 times smaller than the starting feed rod diameter). Use of thermoplastic/ceramic blends having appropriate rheological properties for the cores and shells maintain the volume ratio of the original feed rod. Preferably, the viscosity of the core material is approximately equivalent to the viscosity of the shell material. Use of core and shell materials with approximately equivalent viscosities provides improved flow stability and control to assist with maintaining the original geometry of the feed rod.

In general, filaments having diameters of no more than about 250 $\mu$m can be obtained by single filament co-extrusion. Smaller diameter green filaments may be readily broken during the winding and extrusion process, thereby limiting the ability to produce filaments having smaller diameters. To obtain cell sizes smaller than 250 $\mu$m, filaments having diameters of between about 1 to about 2 mm may be extruded and bundled together to form a multifilament feed rod having a diameter of about 22 mm. This feed rod is then extruded through a spinneret to produce multifilament spaghetti. Using this multifilament co-extrusion (MFCX) procedure, cell sizes approaching 10 microns or less can be produced.

Filaments having more than one cell composition and/or more than one shell composition can also be prepared to provide the benefits of the properties of the additional composition and/or to insulate the shell material. As an example, a layer of a second cell composition may be disposed around the shell, such that the filament includes a central cell, an intermediate shell and an outer cell. Other combinations of cells and shells also may be prepared as desired. For example, a core material in combination with a plurality of different shells may be used.

Figure 4:
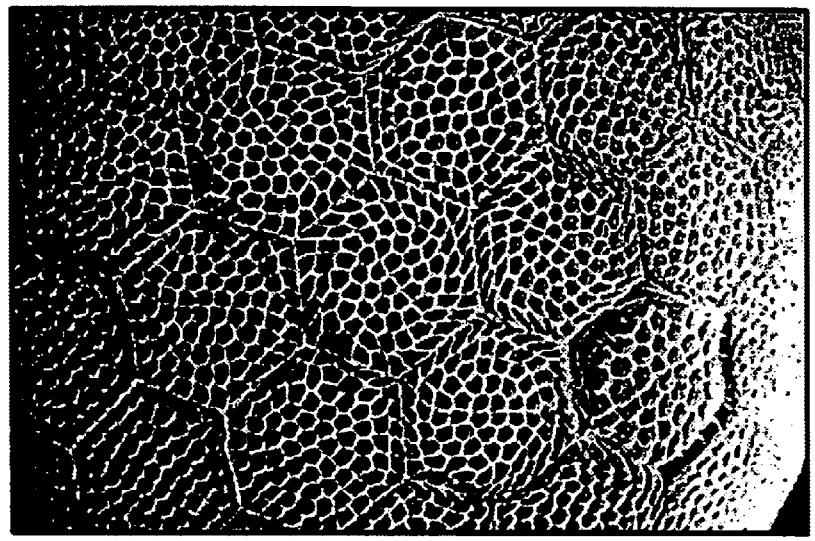
FIG. 4 is a photomicrograph of an axial cross-section of an FM composite in accordance with the present invention.

A plurality of filaments may be bundled together and disposed within another shell. This arrangement of filaments results in essentially a "honeycomb" configuration when arranged to form the FM composite, as shown in FIG. 4. The bundled arrangement maintains the mechanical behavior of the filaments but insulates a "weaker" shell material from the external environment and any harsh conditions.

Numerous modifications and adjustments to the process for preparing filaments may be made to allow for variations in the particular compositions used to prepare the filaments. For example, viscosities may be adjusted, the diameter of the extrusion die may be changed, or the relative volumes of the core and shell may be changed. Other methods for extruding and/or otherwise forming the filaments known to those of skill in the art also may be utilized. For example, any modified process for continuous co-extrusion may be used.

The extruded, composite green filament generally is flexible and may be formed into the structures of the present invention. In one embodiment, the composite coatings include a multifilament FM layer in combination with a uniaxial FM substrate, a quasiisotropic FM substrate, or a monolithic substrate. Such composite coatings can be applied over the surface of the desired structure, essentially as a protective outer layer, to impart the desired mechanical properties to the structure. Generally, the composites are fabricated using a multiple-step process. In a first step, a first FM layer is produced from a plurality of FM filaments. A unidirectional FM billet is laminated using multiple, extruded FM filaments. The billet is sectioned transversely across its width into thin slices, wherein the cells of the multiple filaments are exposed along the planar surfaces of the slices. Each slice sectioned from the billet is the equivalent of one FM layer.

In a second step, FM substrates having fiber orientations different from those of the thin FM layers are produced. For example, a monolithic, a uniaxial, or a quasiisotropic FM substrate next is produced from multiple FM filaments that are arranged, layered, woven, or otherwise manipulated to form a substrate having the desired fiber orientation. For example, a uniaxial FM substrate may be formed by arranging side-by-side multiple, extruded FM filaments having a predetermined length to form essentially a sheet with the filament axes arranged in parallel and extending the length of the sheet. One or more sheets are layered on top of one another until a desired thickness is obtained.

An FM composite structure is formed by placing a thin FM layer over an FM substrate so that the orientation of the cells in the layer is normal to the surface of the substrate. Additional FM layers may be placed over the first FM layer as desired. The FM composite is then warm laminated to join the FM layers to the surface of each substrate to form the FM composite coating.

In other embodiments, the FM composites form all or most of the structure. Such structures provide enhanced mechanical properties associated with FM composites for the entire usage life of the structure. In comparison, the benefits of the FM composite coatings will last only so long as the coating remains on the structure, that is, until the coating is worn through. Generally, filaments may be bundled, woven, wound, braided, chopped, pressed, or laid up to produce essentially a near net shape pre-form. In a typical two-dimensional (2D) lay-up, the composite filament is wound on a computer numerically controlled (CNC) drum winder. The winder includes a rotating plastic drum driven by a servomotor from Compumotor, Rohnert Park, Calif. A single axis motion controller from Compumotor, Rohnert Park, Calif. is used to adjust the filament position as the filament is wound around the drum. Two-dimensional parts having a desired fiber alignment can be fabricated using the CNC drum winder.

After winding, composite filament sheets are cut to the desired shape and dimensions. The cut sheets can then be laid up in any standard 2D architecture (i.e. uniaxial, 0°/90°, quasi-isotropic, etc.). After the 2D pre-form is laid-up, a uniaxial platen press is used to warm laminate the component part.

In another embodiment of the present invention, the green filaments are grouped or bundled into a cylinder or other predetermined shape. The bundled filaments are cut to a predetermined length and machined, molded or otherwise formed to provide a structure having a desired shape and having the FM filaments extending generally parallel to the axis of the structure. One or more FM layers may be disposed across a surface of the structure as desired to provide increased enhancement of the mechanical properties of the structure. The FM composite structure is warm laminated to consolidate the FM filaments.

In other embodiments, articles having various filament characteristics and orientations may be provided. For example, in preparing an FM layer, different combinations of cell and/or boundary materials, filament size, filament shape, and filament orientation are contemplated as being within the scope of the invention. Such variations in these variables can be applied on a layer-to-layer basis, that is, a first layer is formed of filaments of uniform composition, size, shape and orientation and a second layer is formed with filaments having a composition, size, shape and/or orientation different from that of the first layer. Such variations also can be applied within a particular layer, that is, the layer is formed of filaments of differing compositions, sizes, shapes, and/or orientations. Any number and combination of layers may be used in forming the FM composite article in order to achieve the benefits of desired properties of the FM materials.

In another embodiment, the FM structure can be produced using rapid prototyping techniques as known to those skilled in the art or any modified rapid prototyping technique. For example, the feed rod can be loaded into a freeform fabrication apparatus having a heated barrel. A molten material is formed and directly feeds into a fine deposition nozzle having a volumetric flow rate that can be adjusted for high raw material throughput dispensing. The molten material is extruded through a high pressure nozzle onto a foam pad. The foam pad is mounted on a 4-axis, motorized, computer numerically controlled (CNC) platen. The solid freeform fabrication technique provides a complex part from one single, continuous fiber.

Although the invention is described with reference to generally cylindrical-shaped FM filaments that are bundled together to form FM composites wherein the shape of the filaments become essentially hexagonal in cross-section as a result of processing, other configurations are contemplated, as will be appreciated by those skilled in the art. For example, filaments having square, rectangular or triangular cross-sections may be obtained by varying the shape of the extrusion die accordingly. Additionally, the shape of the die used in the laminating step also may be modified accordingly as desired. Thus, different shapes and configurations of filaments in the FM composite may be obtained, which may impact the resultant mechanical properties of the FM composite.

A binder burnout furnace, such as commercially available from Lindberg, Watertown, Wis. is used to remove polymer binder from the formed composite coatings and FM composite structures. Sintering processes, including hot pressing, hot isostatic pressing or pressureless sintering, provide final consolidation and densification of the composite coatings and FM composite structures. A typical induction hot-press such as commercially available from Vacuum Industries, Somerville, Mass. is capable of a maximum temperature of 2400° C. and a maximum load of 100 tons and can be operated in several different environments including vacuum, argon, and nitrogen atmospheres.

In other embodiments, alternative methods of preparing FM filaments and composite materials may be utilized. Alternative compositions and methods, including those described in the co-pending U.S. patent applications listed in Table 1, which are incorporated by reference herein in their entireties, are contemplated for use with the present invention.

TABLE 1

| TITLE | INVENTORS | FILING DATE | ATTY DOCKET NO. |
|---|---|---|---|
| CONSOLIDATION AND DENSIFICATION METHODS FOR FIBROUS MONOLITH PROCESSING | Manish P. Sutaria<br>Mark J. Rigali<br>Ronald A. Cipriani<br>Gregory J. Artz<br>Anthony C. Mulligan | Dec. 04, 2001 | 03248.00039 |
| METHODS AND APPARATUS FOR PREPARATION OF THREE-DIMENSIONAL BODIES | Anthony C. Mulligan<br>Mark J. Rigali<br>Manish P. Sutaria<br>Gregory J. Artz<br>Felix H. Gafner<br>K. Ranji Vaidayanathan | Dec. 04, 2001 | 03248.00040 |
| COMPOSITE STRUCTURES FOR USE IN HIGH TEMPERATURE APPLICATIONS | Mark J. Rigali<br>Manish P. Sutaria<br>Greg F. Hilmas<br>Anthony C. Mulligan<br>Marlene Platero-AllRunner<br>Mark M. Opeka | Dec. 04, 2001 | 03248.00043 |
| COMPOSITIONS AND METHODS FOR PREPARING MULTIPLE-COMPONENT COMPOSITE MATERIALS | Mark J. Rigali<br>Manish P. Sutaria<br>Felix Gafner<br>Ron Cipriani<br>Randy Egner<br>Randy C. Cook | Dec. 04, 2001 | 03248.00044 |
| MULTI-FUNCTIONAL COMPOSITE STRUCTURES | Anthony C. Mulligan<br>John Halloran<br>Dragan Popovich<br>Mark J. Rigali<br>Manish P. Sutaria<br>K. Ranji Vaidyanathan<br>Michael L. Fulcher<br>Kenneth L. Knittel | Dec. 04, 2001 | 03248.00045 |

EXAMPLES

The following examples are intended to illustrate the present invention and should not be construed as in any way limiting or restricting the scope of the present invention.

Example 1

Initial damage resistant testing was conducted on a FM composite consisting of a cellular diamond material surrounded by a ductile metal phase of WC—Co (FIG. 4). Impact drop tests demonstrated that the FM composite remained undamaged at much higher drop heights as compared to a standard monolithic diamond material.

Example 2

Composites having unique architectures were produced by fabricating $Si_3N_4/BN$ FM layers and hot pressing the layers into different $Si_3N_4$-based substrates. Three different sets of $Si_3N_4$ were fabricated for testing. The three billets fabricated were: 1) a $Si_3N_4/BN$ FM layer on a monolithic $Si_3N_4$ substrate, 2) a $Si_3N_4/BN$ FM layer on a unidirectional $Si_3N_4/BN$ FM substrate, and 3) a $Si_3N_4/BN$ FM layer on a quasiisotropic $Si_3N_4/BN$ FM substrate.

These samples were fabricated using a two-step process. First, the $Si_3N_4/BN$ FM layer was produced. Specifically, a unidirectional $Si_3N_4/BN$ billet (3"×4.5"×0.5") was laminated using multiple, extruded $Si_3N_4/BN$ filaments. The individual cell size was approximately 200 μm. Thin 0.12 inch FM layers were produced by sectioning the billet into thin 0.12 inch slices along its width to expose the cells. Each 0.12 inch slice constituted a FM layer.

Second, the monolithic, uniaxial, and quasiisotropic FM substrates were processed. For the monolithic $Si_3N_4$ substrate, $Si_3N_4$ powder was compounded with thermoplastics and hot pressed into a 3"×3"×0.125"billet. For the uniaxial and quasiisotropic FM substrates, $Si_3N_4/BN$ green fiber was extruded to produce 340 μm filaments. The filaments were then manually layed-up in the desired architectures to form billets. The layed-up billets were warm laminated. The final dimensions of the billets were 3"×3"×0.125".

Figure 5A:
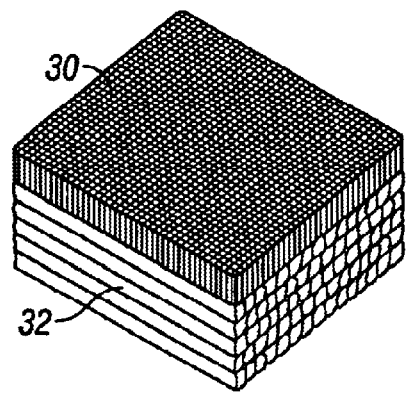
FIG. 5a is a schematic of a section of a fibrous monolith composite in accordance with the present invention, illustrating the filament orientations of a multifilament fibrous monolith layer and a uniaxial fibrous monolith substrate.
Figure 5B:
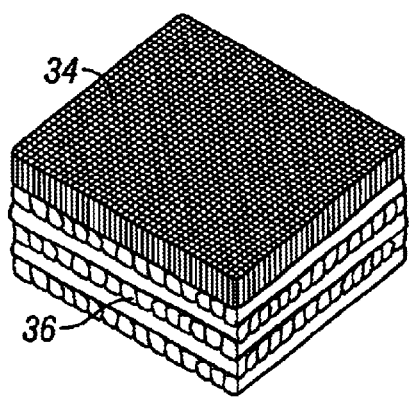
FIG. 5b is a schematic of a section of a fibrous monolith composite in accordance with the present invention, illustrating the filament orientations of a multifilament fibrous monolith layer and a quasiisotropic fibrous monolith.
Figure 5C:
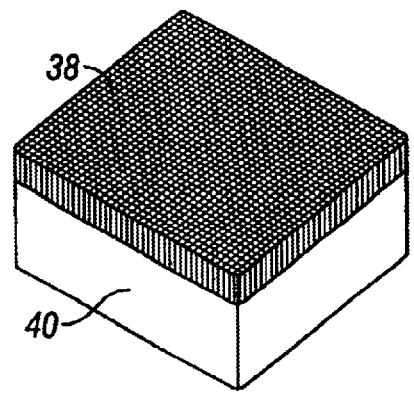
FIG. 5c is a schematic of a section of a fibrous monolith composite in accordance with the present invention, illustrating the filament orientations of a multifilament fibrous monolith layer and a monolithic substrate.

Next, a FM composite was formed by placing the 0.12 inch FM slices on the three different substrates such that the orientation of the cells in the slices were normal to the surface of the substrates. The composites were then warm laminated to join the thin FM slices to the surface of each substrate. The overall thickness of the FM layer was approximately 25% of the overall thickness of the composite. The composites were placed in binder burnout for four days and then hot-pressed at 1750° C. and 3.1 ksi. Cross-sections of the composites showing the architectures of the consolidated composites are illustrated in FIGS. 5a–5c. FIG. 5a illustrates a composite having a multifilament FM layer 30 and a uniaxial FM substrate 32. FIG. 5b illustrates a composite having a multifilament FM layer 34 and a quasi-isotropic FM substrate 36. FIG. 5c illustrates a composite having a multifilament FM layer 38 and a monolithic substrate 40.

Example 3

A system consisting of a multifilament tungsten carbide-cobalt alloy/tungsten-nickel-iron metal alloy FM composite exhibits high hardness, excellent fracture toughness, wear, and abrasion resistance and thus is suitable for use as a wear resistant, damage-tolerant material. Such a carbide-metal matrix composite may be used in metal and wood cutting tool inserts, as well as in applications in the mining and construction industries, including drill bit inserts, grader blade inserts, conical tool inserts and roof bit inserts.

Sinterable tungsten carbide-6%-cobalt powder (particle size of about –325 mesh) is blended with copolymers and plasticizer to form a FM core material according to the formulation shown in Table 2.

TABLE 2

| Material | Density (g/cc) | Volume % | Volume (cc) | Weight (g) |
|---|---|---|---|---|
| WC-6% Co alloy[1] | 14.96 | 55.0 | 24.75 | 370.26 |
| EEA copolymer[2] | 0.93 | 24.0 | 10.80 | 10.04 |
| EAA copolymer[3] | 0.93 | 16.0 | 7.20 | 6.70 |
| MPEG-550[4] | 1.100 | 5.0 | 2.25 | 2.48 |

[1]tungsten carbide-6%-cobalt alloy from Cerac, Inc., designated as T-1175
[2]ethylene-ethyl acetate copolymers from Union Carbide
[3]ethylene-acrylic acid copolymers from Union Carbide
[4]methoxypolyethylene glycol, average molecular weight of 550 (a plasticizer)

A Brabender mixing machine is used to mix the materials. The MPEG 550 is added to adjust the blending torque of the mixture to approximately 200 kg-M$^2$. The mixture of materials can then be formed into a feed rod as described in detail above.

In a separate process, sinterable W—Ni—Fe alloy powder (particle size of about 2–5 μm) is blended with co-polymers and plasticizers to form the FM shell material according to the formulation shown in Table 3.

TABLE 3

| Material | Density (g/cc) | Volume % | Volume (cc) | Weight (g) |
|---|---|---|---|---|
| W—Ni—Fe alloy[1] | 14.96 | 55.0 | 24.75 | 370.26 |
| EEA copolymer[2] | 0.93 | 24.0 | 10.80 | 10.04 |
| EAA copolymer[3] | 0.93 | 27.38 | 12.32 | 11.46 |
| B-67 copolymer[4] | 1.06 | 3.65 | 1.64 | 1.74 |
| Luwax AL 3[5] | 0.92 | 2.20 | 0.99 | 0.91 |
| MPEG-550[6] | 1.100 | 5.0 | 2.25 | 2.48 |
| HMO[7] | 0.881 | 6.40 | 2.88 | 2.54 |

[1]tungsten nickel iron alloy powder
[2]ethylene-ethyl acetate copolymers from Union Carbide
[3]ethylene-acrylic acid copolymers from Union Carbide
[4]acryloid resin from Rohm and Haas
[5]a wax from BASF
[6]methoxypolyethylene glycol, average molecular weight of 550 (a plasticizer)
[7]heavy mineral oil (a plasticizer)

A Brabender mixing machine is used to mix the materials. The MPEG 550 is added to adjust the blending torque of the mixture to approximately 100 kgm$^2$. The mixture of materials can then be formed into a cylindrical shell as described in detail above.

A controlled geometry feed rod is assembled by combining the tungsten carbide cobalt core rod with the tungsten nickel iron shells. The feed rod is loaded into the extrusion cylinder and extruded at 150° C. A 2 mm diameter tungsten carbide-cobalt/tungsten-nickel-iron alloy monofilament fiber is obtained and collected on a motor controlled spooler. To fabricate the multifilament fiber, the tungsten carbide-cobalt/tungsten-nickel-iron alloy monofilament fiber is cut into 82 segments of 5.5 inches each and loaded into a molding cylinder to form a multifilament feed rod. This multifilament feed rod is extruded to form a continuous length of 2 mm multifilament fiber.

Figure 6:
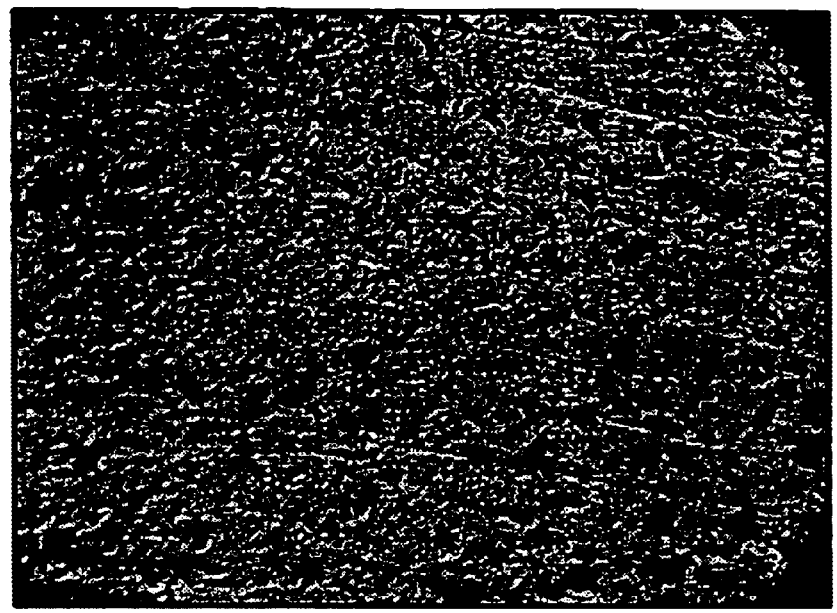
FIG. 6 is a photomicrograph of an axial cross-section of another composite in accordance with the present invention.

The tungsten carbide-cobalt/tungsten-nickel-iron alloy multifilament fibers are arranged into a 1 inch wide by 3 inch long by 0.25 inch thick coupon and molded to provide a green fibrous monolith ceramic. The green tungsten carbide-cobalt/tungsten-nickel-iron alloy multifilament fibrous monolith ceramic is heated in a furnace in a nitrogen atmosphere to remove the binder and then hot pressed at 1550° C. and 2 ksi pressure for about 1 hour to provide a sintered fibrous monolith article having core to shell ratio of about 82.5% to about 17.5%. A photomicrograph of a polished, sintered article that was photographed through a reflected light microscope is shown in FIG. 6.

Example 4

A tungsten carbide material with a low cobalt content (for example, between about 0% to 6% cobalt by weight) that exhibits the mechanical properties of high hardness, wear resistance, and low toughness can be combined with a tungsten carbide material with a relatively high cobalt content (for example, between about 6% to 20% cobalt by weight) that exhibits the mechanical properties of moderate hardness, wear resistance and high toughness. The resulting FM composite exhibits improved mechanical properties as compared to the individual carbide constituents, including high hardness, excellent fracture toughness, and wear and abrasion resistance.

A multifilament tungsten carbide-3%-cobalt alloy/tungsten carbide-6%-cobalt alloy multifilament FM composite is prepared in this example. Sinterable tungsten carbide-3%-cobalt powder (particle size of about 5 μm) is blended with copolymer and plasticizer to form the FM core material according to the formulation shown in Table 4.

TABLE 4

| Material | Density (g/cc) | Volume % | Volume (cc) | Weight (g) |
|---|---|---|---|---|
| WC-3% Co alloy[1] | 14.96 | 50.0 | 22.50 | 336.38 |
| EEA copolymer[2] | 0.93 | 42.0 | 18.90 | 17.58 |
| MPEG-550[3] | 1.100 | 8.0 | 3.60 | 3.96 |

[1]tungsten carbide-3%-cobalt alloy from Stanford Materials, designated as CB7427-Q4
[2]ethylene-ethyl acetate copolymers from Union Carbide
[3]methoxypolyethylene glycol, average molecular weight of 550 (a plasticizer)

A Brabender mixing machine is used to mix the materials. The MPEG 550 is added to adjust the blending torque of the mixture to approximately 200 kg-m$^2$. The mixture of materials can then be formed into a feed rod as described in detail above.

In a separate process, sinterable tungsten carbide-6%-cobalt alloy powder (particle size of about –325 mesh) is blended with co-polymers and plasticizer to form the FM shell material according to the formulation shown in Table 5.

TABLE 5

| Material | Density (g/cc) | Volume % | Volume (cc) | Weight (g) |
|---|---|---|---|---|
| WC-6% Co alloy[1] | 14.96 | 50.0% | 22.50 | 336.38 |
| EEA copolymer[2] | 0.93 | 27.0% | 12.15 | 11.30 |
| EAA copolymer[3] | 0.93 | 18.0% | 8.10 | 7.53 |
| MPEG-550[4] | 1.100 | 5.0% | 2.25 | 2.48 |

[1]tungsten carbide-6%-cobalt alloy powder from Cerac, Inc., designated as T-1175
[2]ethylene-ethyl acetate copolymers from Union Carbide
[3]ethylene-acrylic acid copolymers from Union Carbide
[4]methoxypolyethylene glycol, average molecular weight of 550 (a plasticizer)

A Brabender mixing machine is used to mix the materials. The MPEG 550 is added to adjust the blending torque of the mixture to approximately 100 kg-m². The mixture of materials can then be formed into a cylindrical shell as described in detail above.

A controlled geometry feed rod is assembled by combining the tungsten carbide-3%-cobalt alloy core rod with the tungsten carbide-6%-cobalt alloy shells. The feed rod is loaded into the extrusion cylinder and extruded at 150° C. A 2 mm diameter tungsten carbide-3%-cobalt alloy/tungsten carbide-6%-cobalt alloy monofilament fiber is obtained and collected on a motor controlled spooler. To fabricate the multifilament fiber, the tungsten carbide-cobalt/tungsten-nickel-iron alloy monofilament fiber is cut into 82 segments of 5.5 inches each and loaded into a molding cylinder to form a multifilament feed rod. This multifilament feed rod is extruded to form a continuous length of 2 mm multifilament fiber.

The tungsten carbide-3%-cobalt alloy/tungsten carbide-6%-cobalt alloy multifilament fibers are arranged into a 1 inch wide by 3 inch long by 0.25 inch thick coupon and molded to provide a green fibrous monolith ceramic. The tungsten carbide-3%-cobalt alloy/tungsten carbide-6%-cobalt alloy multifilament fibrous monolith ceramic is heated in a furnace in a nitrogen atmosphere to remove the binder and hot pressed at 1400° C. and 2 ksi pressure to provide a sintered fibrous monolith article having core to shell ratio of about 82.5% to about 17.5%.

Example 5

Figure 7:
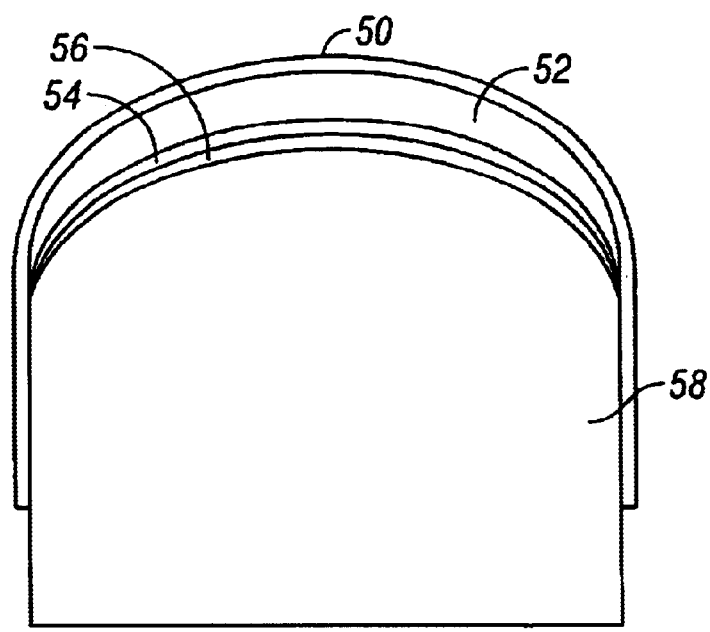
FIG. 7 is a perspective view of a fibrous monolith bit insert in accordance with the present invention.

A green feed rod about 3 inches long and about 0.79 inches in diameter was fabricated of a FM composition (diamond-WC—Co/WC—Co) in accordance with the present invention. The feed rods were formed of a plurality of FM filaments about 130 μm in diameter with the axis of each filament aligned parallel to the axis of the feed rod. The feed rod was sectioned radially into wafers of about 20 mm diameter and 0.03 inches thickness. The wafers were sanded down to a thickness of about 0.025 inches, dried at about 55° C., loaded into a niobium can, and laminated into hemispherically-shaped caps using a steel die and WC punch. As shown in FIG. 7, the niobium can 50 was loaded with the FM cap 52, two transition layers 54, 56 of diamond+WC+Co material, and a fully dense WC—Co insert 58. The green caps 52 were bonded to the niobium cans 50 by a thin layer of adhesive and fired. The inserts were cold pressed in a 40 ton press, loaded into a six-sided press and pressed at about 800,000 psi at about 1300° C. for about 4 to 5 minutes. After firing, the niobium can was removed in a boiling caustic solution followed by sand blasting and a minimum of machining to produce a finished bit insert.

Numerous modifications to the invention are possible to further improve the properties of structures used in dynamic environments. Thus, modifications and variations in the practice of the invention will be apparent to those skilled in the art upon consideration of the foregoing detailed description of the invention. Although preferred embodiments have been described above and illustrated in the accompanying drawings, there is no intent to limit the scope of the invention to these or other particular embodiments. Consequently, any such modifications and variations are intended to be included within the scope of the following claims.

What is claimed is:

1. A composite having resistance to impact damage or wear comprising:
   at least one layer of fibrous monolith material; and
   at least one monolithic substrate.

2. A composite having resistance to impact damage or wear comprising:
   at least one layer of fibrous monolith material; and
   at least one unidirectional fibrous monolith substrate.

3. A composite having resistance to impact damage or wear comprising:
   at least one layer of fibrous monolith material; and
   at least one quasiisotropic fibrous monolith substrate.

4. An article of manufacture comprising a fibrous monolith construct, said construct comprising in combination at least two layers of fibrous monolithic materials wherein each layer is comprised of multiple cell phase and boundary phase sections having distinct and different orientations.

5. An article of manufacture comprising in combination two layers of fibrous monolithic material wherein each of the layers is comprised of multiple cell phases and a boundary phase between the cell phases, and wherein the cell phases are comprised of different materials.

6. The article of claim 5 wherein the cell phases in each layer has a distinct and different orientation.

7. The article of claim 4 or 5 wherein the cell phases of each layer are selected from the group consisting of metal, metal alloy, carbide, nitride, boride, oxide, phosphate and silicide.

8. The article of claim 4 or 5 wherein the boundary phase of each layer is selected from the group consisting of metal, metal alloy, carbide, nitride, boride, oxide, phosphate and silicide.

9. The article of claim 4 or 5 wherein a first layer is comprised of uniaxial cell phases.

10. The article of claim 4 or 5 wherein a first layer is comprised of equally sized cell phases and equally dimensioned boundary phases.

11. The article of claim 4 or 5 wherein a first layer is comprised of cell phases surrounded by boundary phases and also including boundary phases surrounded by cell phases.

12. The article of claim 4 or 5 wherein the cell phases of each layer comprise filament having a cross-sectional area, and the cell phases of each layer have distinct and different cross-sectional area.

13. The article of claim 4 or 5 wherein the cell phases of each layer comprise a filament having a cross-sectional shape, and the cell phases of each layer have a distinct and different cross-sectional shape.

14. The article of claim 4 or 5 wherein the boundary phases of each layer comprise a filament having a cross-sectional area and the boundary phases of each layer have a distinct and different cross-sectional area.

15. The article of claim 4 or 5 wherein the boundary phase of each layer comprises a filament having a cross-sectional shape and the boundary phases of each layer have a distinct and different shape.

16. A composite having resistance to impact damage or wear comprising:
   at least one layer of fibrous monolith material; and
   at least one biaxial fibrous monolith substrate.

* * * * *